United States Patent
Kwan

(10) Patent No.: US 8,664,156 B2
(45) Date of Patent: Mar. 4, 2014

(54) IRREVERSIBLE THERMOCHROMIC INK COMPOSITIONS

(75) Inventor: Wing Sum V. Kwan, Chicago, IL (US)

(73) Assignee: Sanford, L.P., Oak Brook, IL (US)

(*) Notice: Subject to any disclaimer, the term of this patent is extended or adjusted under 35 U.S.C. 154(b) by 86 days.

(21) Appl. No.: 13/342,004

(22) Filed: Dec. 31, 2011

(65) Prior Publication Data
US 2013/0172181 A1 Jul. 4, 2013

(51) Int. Cl.
*B41M 5/28* (2006.01)
*B41M 5/333* (2006.01)

(52) U.S. Cl.
USPC ........... 503/201; 503/205; 503/208; 503/214; 503/215

(58) Field of Classification Search
USPC ........................ 503/201, 205, 208, 214, 215
See application file for complete search history.

(56) References Cited

U.S. PATENT DOCUMENTS

| | | |
|---|---|---|
| 3,516,941 A | 6/1970 | Matson |
| 3,560,229 A | 2/1971 | Farnham |
| 3,658,543 A | 4/1972 | Gerlach, Jr. et al. |
| 4,021,591 A | 5/1977 | DeVries et al. |
| 4,028,118 A | 6/1977 | Nakasuji et al. |
| 4,062,644 A | 12/1977 | Sponaes et al. |
| 4,162,165 A | 7/1979 | Schwab |
| 4,421,560 A | 12/1983 | Kito et al. |
| 4,425,161 A | 1/1984 | Shibahashi et al. |
| 4,547,429 A | 10/1985 | Greiner et al. |
| 4,550,676 A | 11/1985 | Francis |
| 4,620,941 A | 11/1986 | Yoshikawa et al. |
| 4,622,267 A | 11/1986 | Riecke |
| 4,720,301 A | 1/1988 | Kito et al. |
| 4,732,810 A | 3/1988 | Kito et al. |
| 4,865,648 A | 9/1989 | Kito et al. |
| 5,002,924 A | 3/1991 | Seitz |
| 5,128,308 A | 7/1992 | Talvalkar |

(Continued)

FOREIGN PATENT DOCUMENTS

| | | |
|---|---|---|
| DE | 10303914 A1 | 8/2004 |
| EP | 1149880 A1 | 10/2001 |

(Continued)

OTHER PUBLICATIONS

Muthyala (ed.), Chemistry and Applications of Leuco Dyes, Topics in Applied Chemistry, Plenum Press (1997).

(Continued)

*Primary Examiner* — Bruce H Hess
(74) *Attorney, Agent, or Firm* — Marshall, Gerstein & Borun LLP

(57) ABSTRACT

An irreversible thermochromic ink composition can include thermochromic pigment capsules dispersed in a carrier. The irreversible thermochromic pigment capsules can include an inner core having a color changing dye, a color activator for activating the color changing dye, and a wax, an outer core surrounding the inner core and comprising a color destroying agent, and a shell surrounding the outer core. Alternatively, the irreversible thermochromic pigment capsules can include an inner core having a color destroying agent and a wax, an outer core surrounding the inner core and comprising a color changing dye and a color activator for activating the color changing dye, and a shell surrounding the outer core. Written marks made with the irreversible thermochromic inks can be rendered a different color or substantially colorless by application of a sufficient amount of heat to melt or substantially liquefy the wax in the irreversible thermochromic pigment capsules.

19 Claims, 2 Drawing Sheets

(56) References Cited

U.S. PATENT DOCUMENTS

| | | |
|---|---|---|
| 5,194,183 A | 3/1993 | Munch et al. |
| 5,248,652 A | 9/1993 | Talvalkar |
| 5,350,633 A | 9/1994 | Sumii et al. |
| 5,350,634 A | 9/1994 | Sumii et al. |
| 5,401,577 A | 3/1995 | Seitz |
| 5,500,040 A | 3/1996 | Fujinami |
| 5,527,385 A | 6/1996 | Sumii et al. |
| 5,558,699 A | 9/1996 | Nakashima et al. |
| 5,558,700 A | 9/1996 | Shibahashi et al. |
| 5,591,255 A | 1/1997 | Small et al. |
| 5,785,746 A | 7/1998 | Kito et al. |
| 5,786,838 A | 7/1998 | Steinhauser et al. |
| 5,873,932 A | 2/1999 | Fujita et al. |
| 5,879,438 A | 3/1999 | Fujita et al. |
| 5,879,443 A | 3/1999 | Senga et al. |
| 5,919,404 A | 7/1999 | Fujita et al. |
| 5,922,115 A | 7/1999 | Sano et al. |
| 5,997,849 A | 12/1999 | Small et al. |
| 6,004,900 A | 12/1999 | O'Brien, III |
| 6,048,387 A | 4/2000 | Shibahashi et al. |
| 6,139,779 A | 10/2000 | Small et al. |
| 6,251,571 B1 | 6/2001 | Dessauer et al. |
| 6,326,332 B1 | 12/2001 | Takayama |
| 6,413,305 B1 | 7/2002 | Mehta et al. |
| 6,494,950 B1 | 12/2002 | Fujita et al. |
| 6,638,620 B2 | 10/2003 | Nakashima et al. |
| 6,669,765 B2 | 12/2003 | Senga et al. |
| 6,700,125 B2 | 3/2004 | Ito et al. |
| 6,863,720 B2 | 3/2005 | Kitagawa et al. |
| 6,953,345 B1 | 10/2005 | Nakashima et al. |
| 6,958,181 B1 | 10/2005 | Gore |
| 6,964,168 B1 | 11/2005 | Pierson et al. |
| 7,168,876 B2 | 1/2007 | Nakashima et al. |
| 7,325,910 B2 | 2/2008 | Pelletier |
| 7,332,109 B2 | 2/2008 | Senga et al. |
| 7,335,624 B2 | 2/2008 | Senga et al. |
| 7,494,537 B2 | 2/2009 | Ono et al. |
| 7,575,386 B2 | 8/2009 | Shibahashi et al. |
| 7,632,564 B2 | 12/2009 | Nakashima |
| 7,708,913 B2 | 5/2010 | Fujita |
| 7,736,695 B2 | 6/2010 | Schwantes et al. |
| 8,182,596 B2 * | 5/2012 | Kurihara et al. ............ 106/31.32 |
| 2002/0107304 A1 | 8/2002 | Leu et al. |
| 2002/0170461 A1 | 11/2002 | Mehta et al. |
| 2003/0122123 A1 | 7/2003 | Deng et al. |
| 2004/0229754 A1 | 11/2004 | Fujita |
| 2006/0112851 A1 | 6/2006 | Ono et al. |
| 2007/0189836 A1 | 8/2007 | Senga et al. |
| 2007/0251912 A1 | 11/2007 | Sixou et al. |
| 2008/0113862 A1 | 5/2008 | Stovold et al. |
| 2008/0124164 A1 | 5/2008 | Ito et al. |
| 2008/0292385 A1 | 11/2008 | Wase et al. |
| 2009/0050013 A1 | 2/2009 | Fujita |
| 2009/0071370 A1 | 3/2009 | Nakashima |
| 2010/0012018 A1 | 1/2010 | Ribi |
| 2010/0098475 A1 | 4/2010 | Fujita et al. |
| 2010/0098476 A1 | 4/2010 | Imamura et al. |
| 2010/0120614 A1 | 5/2010 | Ono |
| 2010/0275813 A1 | 11/2010 | Kurihara et al. |

FOREIGN PATENT DOCUMENTS

| | | |
|---|---|---|
| EP | 1469046 A1 | 10/2004 |
| FR | 1223330 A | 6/1960 |
| WO | WO-01/04221 A1 | 1/2001 |

OTHER PUBLICATIONS

Partial International Search Report from corresponding international application No. PCT/US2012/070560, mailing date Mar. 22, 2013.

Matsui Shikiso Chemical Co., Ltd, Technical Data Sheet for Thermolock AQ Ink #79 (Aug. 5, 2009).

International Search Report and Written Opinion, International Application No. PCT/US2012/070560, mailing date Oct. 14, 2013.

\* cited by examiner

IRREVERSIBLE THERMOCHROMIC INK COMPOSITIONS

BACKGROUND

1. Field of the Disclosure

The disclosure is generally related to irreversible thermochromic ink compositions and, more particularly, to irreversible thermochromic ink compositions and pigment capsules including a color changing dye, a color activator, a color destroying agent, and a wax for chemically separating the color changing dye and color activator from the color destroying agent, wherein the activated color changing dye is capable of becoming substantially colorless upon interaction/contact with the color destroying agent.

2. Brief Description of Related Technology

Thermochromic inks change color in response to changes in temperature. Known thermochromic inks often include leuco dyes as the color changing component. Leuco dyes typically exist in two different forms, a colored form and a substantially colorless form. Leuco dyes which change forms in response to local changes in pH are typically used in known thermochromic inks. The change in pH can be brought about in such systems by contacting the leuco dye with a color activator/developer, which can induce proton transfer to the leuco dye and thereby cause the leuco dye to adopt its colored form, but similar color changes from substantially colorless to colored can also result from electron transfer and/or proton transfer reactions. From a structural standpoint, the change from substantially colorless to colored is often induced by cleaving a lactone ring to form a more highly conjugated species that absorbs in the visible range. The reverse change from colored to substantially colorless can then be brought about by proton abstraction and reformation of the lactone ring.

Known thermochromic inks often exhibit 'hysteresis' associated with the color change, i.e., the color change of written marks made with such inks is reversible. One representative example, U.S. Pat. No. 5,558,699, discloses a thermochromic color-memory composition comprising a homogeneous solubilized mixture of three essential components including (a) an electron-donating color-developing organic compound, (b) an electron-accepting compound, and (c) a reaction medium for controlling the reaction of (a) with (b). The thermochromic compositions of the '699 patent change color with a large hysteresis width ($\Delta H$) of from 8° C. to 80° C. As a result, written marks made using the thermochromic inks typically exhibit a colored state at room temperature, change from the colored state to substantially colorless upon application of heat (i.e., heat can be applied to a substrate to erase written marks previously made thereon), and change back to the initial colored state when cooled below a certain temperature (i.e., the substrate is cooled, thereby 're-forming' the color of the written marks). Thus, known thermochromic inks typically include a reaction medium which can promote or impede the reaction between the leuco dye and the activator at certain temperatures, such that the leuco dye is present in its colorless form at certain temperatures which are typically substantially above room temperature.

The reversibility of the color change can be particularly undesirable in certain situations, for example, if the consumer does not wish for the original written marks to be 're-revealed.'

DETAILED DESCRIPTION

Disclosed herein are irreversible thermochromic ink compositions, methods of making and using the irreversible thermochromic ink compositions, and irreversible thermochromic pigment capsules.

The irreversible thermochromic pigment capsules and inks containing same according to the disclosure are capable of irreversibly changing color upon application of heat, for example, during an erasure process. Such a color change is advantageously irreversible, even upon cooling.

The irreversible thermochromic pigment capsules include at least one wax that initially maintains chemical separation between an activated color changing dye (i.e., a color changing dye in its colored form) and a color destroying agent. The activated color changing dye is typically provided by a complex of a color changing dye and a color activator. When the temperature of the irreversible thermochromic pigment capsules is increased, for example, to a temperature equal to or greater than the melting point of the wax, the wax melts or substantially liquefies, thereby allowing and promoting contact between the activated color changing dye and the color destroying agent. The color destroying agent interferes with the interaction between the color changing dye and the color activator to thereby change the color of the irreversible thermochromic pigment capsules or, more typically, to thereby render the irreversible thermochromic pigment capsules substantially colorless. The temperature of the irreversible thermochromic pigment capsules can be increased, for example, by heat generated by the frictional forces generated during an erasure process. Any other method of increasing the temperature of the irreversible thermochromic pigment capsules and/or inks to greater than the melting point of the wax can, of course, also be used to effect the color change and/or render the capsules substantially colorless. The same principles are applicable to the irreversible thermochromic ink compositions comprising wax-based compositions described below.

Figure 1:
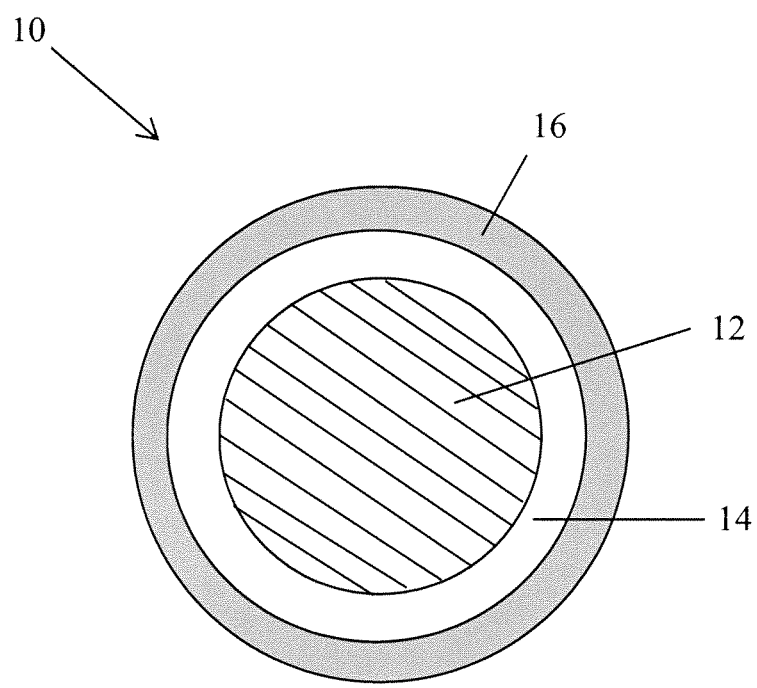
FIG. 1 is a schematic drawing of an irreversible thermochromic pigment capsule in accordance with an embodiment of the disclosure.

Referring to FIG. 1, in accordance with one aspect of the disclosure a thermochromic capsule 10 includes an inner core 12 and an outer core 14 surrounding the inner core 12. The capsule can further include a shell 16 surrounding the outer core 14. The shell 16 provides a continuous, exterior surface that encapsulates and contains the inner and outer cores 12, 14. As described in this aspect of the disclosure, the inner core 12 includes a color changing dye and a color activator mixed with/distributed in a wax. Preferably, the color changing dye and color activator are homogeneously mixed with/distributed in the wax. For example, the color changing dye, the color activator, and the wax can be mixed while heated to a temperature in excess of the melting point of the wax to ensure a homogenous mixture of the color changing dye, the color activator, and the wax. Such mixing can facilitate and increase formation of an activated color changing dye. The mixture forms a solid core upon cooling, with the color changing dye and the color activator being dispersed throughout a wax matrix, i.e., the solid core, in an amount to cause the solid core to be colored as desired. The molten material can be introduced into a mold to provide appropriately sized inner (solid) cores 12. Alternatively, the solid core can be processed as needed in accordance with conventional techniques to provide appropriately sized inner cores 12.

The outer core 14 which may be provided in liquid, solid, and/or semi-solid forms includes a color destroying agent.

The outer core 14 composition should be selected so that the wax matrix of the inner core 12 maintains chemical separation between the activated color changing dye (i.e., the colored form of the color changing dye formed by/between the color changing dye and the color activator) and the color destroying agent. The wax can be melted or sufficiently liquefied by heating the irreversible thermochromic pigment capsule to a temperature most typically in excess of the melting point of the wax, thereby allowing the color destroying agent to interact with the activated color changing dye. The color destroying agent generally disrupts the interaction between the color changing dye and the color activator, thereby causing the color changing dye to revert to its colorless form, and thus also causing the irreversible thermochromic capsule to adopt a different color and/or to become substantially colorless.

Figure 2:
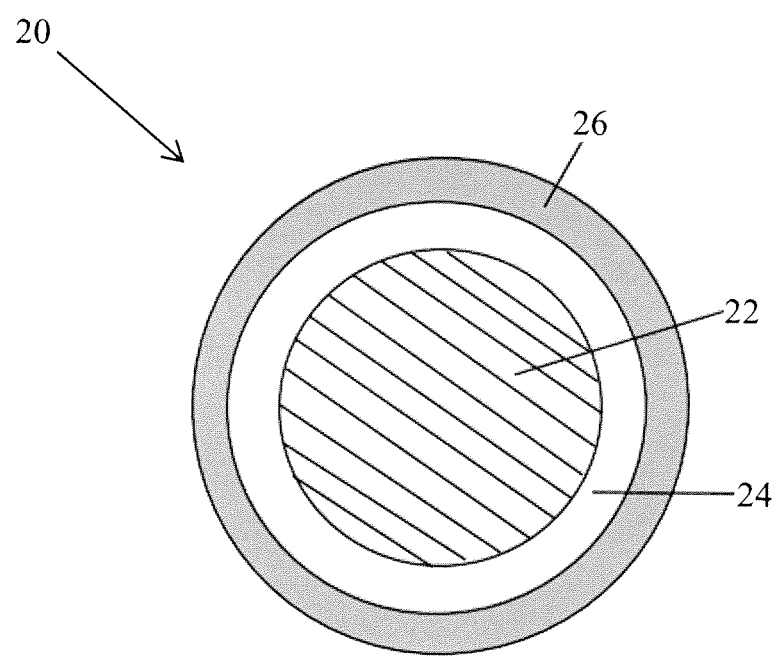
FIG. 2 is a schematic drawing of an irreversible thermochromic ink pigment capsule in accordance with another embodiment of the disclosure.

Referring to FIG. 2, in another aspect of the disclosure, a thermochromic capsule 20 includes an inner core 22 surrounded by an outer core 24. The capsule can further include a shell 26 surrounding the outer core 24. The shell 26 provides a continuous, exterior surface that encapsulates and contains the inner and outer cores 22, 24. As described in this aspect of the disclosure, the inner core 22 includes a color destroying agent mixed with/distributed in a wax. Preferably, the color destroying agent is homogeneously mixed with/distributed in the wax. For example, the color destroying agent and the wax can be mixed while heated to a temperature in excess of the melting point of the wax to ensure a homogenous mixture of the color destroying agent and the wax. The mixture forms a solid core upon cooling, with the color destroying agent being dispersed throughout a wax matrix, i.e., the solid core. The molten material can be introduced into a mold to provide appropriately sized inner (solid) cores 22. Alternatively, the solid core can be processed as needed in accordance with conventional techniques to provide appropriately sized inner cores 22.

The outer core 24 which may be provided in liquid, solid, and/or semi-solid forms includes a color changing dye and a color activator. As with the embodiment shown in FIG. 1, the outer core 14 composition should be selected so that the wax matrix maintains chemical separation between the activated color changing dye (i.e., the colored form of the color changing dye formed by/between the color changing dye and the color activator) and the color destroying agent. The wax can be melted or sufficiently liquefied by heating the irreversible thermochromic pigment capsule to a temperature most typically in excess of the melting point of the wax, thereby allowing the color destroying agent to interact with the activated color changing dye, generally disrupting the interaction between the color changing dye and the color activator, thereby causing the color changing dye to revert to its colorless form, and thus also causing the irreversible thermochromic pigment capsule to adopt a different color and/or to become substantially colorless.

In yet another aspect, an irreversible thermochromic ink composition can include the irreversible thermochromic pigment capsules of either of the above-described embodiments dispersed in a carrier. The carrier can include a solvent, a resin, or a mixture thereof. To achieve sufficient color intensity in written markings made therewith, the irreversible thermochromic ink compositions typically contain at least about 1 wt. %, at least about 5 wt. %, at least about 10 wt. %, for example, between about 1 wt. % and about 60 wt. %, between about 5 wt. % and about 50 wt. %, between about 20 wt. % and about 50 wt. %, and/or between about 35 wt. % and about 45 wt. % of the irreversible thermochromic pigment capsules based on the total weight of the irreversible thermochromic ink composition.

In yet another aspect, a thermochromic ink composition can include a carrier, a color destroying agent dissolved or dispersed in the carrier, and a wax-based composition dispersed in the carrier. The wax-based composition includes a color changing dye and a color activator mixed with/distributed in a wax as described above (i.e., with respect to inner core 12 above). According to this aspect, however, the color destroying agent and the wax-based composition are not encapsulated. The carrier can include a solvent, a resin, or a mixture thereof. The wax maintains chemical separation between the activated color changing dye (e.g., the complex formed by/between the color changing dye and the color activator) and the color destroying agent dissolved or dispersed in the carrier. The wax can be melted or sufficiently liquefied by heating the irreversible thermochromic ink to a temperature most typically in excess of the melting point of the wax, thereby allowing the activated color changing dye to interact with the color destroying agent dispersed or dissolved in the carrier. Interaction of the activated color changing dye and the color destroying agent generally disrupts the interaction between the color changing dye and the color activator, thereby causing the color changing dye to revert to its colorless form, and thus also causing the irreversible thermochromic ink to adopt a different color and/or to become substantially colorless.

In yet another aspect, a thermothromic ink composition can include a color destroying agent and a wax-based composition dispersed in the color destroying agent. In this aspect, the color destroying agent also functions as the carrier of the ink composition (i.e., the color destroying agent comprises more than 50 wt % of the carrier, for example, 90 wt. % of the carrier or even 95 wt. % of the carrier). The carrier can further include relatively smaller amounts of functional solvents (such as a humectant), a resin, or a mixture thereof. The wax-based composition includes a color changing dye and a color activator mixed with/distributed in a wax as described above (i.e., with respect to inner core 12 above). According to this aspect (as in the immediately preceding one), the color destroying agent and the solid wax-based composition are not encapsulated. The wax maintains chemical separation between the activated color changing dye (i.e., the colored form of the color changing dye formed by/between the color changing dye and the color activator) and the color destroying agent carrier. The wax can be melted or sufficiently liquefied by heating the irreversible thermochromic ink to a temperature most typically in excess of the melting point of the wax, thereby allowing the activated color changing dye to interact with the color destroying agent. Interaction of the activated color changing dye and the color destroying agent generally disrupts the interaction between the color changing dye and the color activator, thereby causing the color changing dye to revert to its colorless form, and thus also causing the irreversible thermochromic ink to adopt a different color and/or to become substantially colorless.

In yet another aspect, a thermochromic ink composition can include a carrier, a color changing dye and a color activator dissolved or dispersed in the carrier, and a wax-based composition dispersed in the carrier. In this aspect, the wax-based composition includes the color destroying agent mixed with/distributed in the wax with a wax as described above (i.e., with respect to inner core 22 above). According to this aspect, the color changing dye, color activator, and the wax-based composition are not encapsulated. The carrier can include a solvent, a resin, or a mixture thereof. The wax maintains chemical separation between the activated color changing dye (i.e., the colored form of the color changing dye formed by/between the color changing dye and the color activator) and the color destroying agent dissolved or dispersed in the carrier. The wax can be melted or sufficiently liquefied by heating the irreversible thermochromic ink to a temperature most typically in excess of the melting point of the wax, thereby allowing the color destroying agent to interact with the activated color changing dye dispersed or dissolved in the carrier, generally disrupting the interaction between the color changing dye and the color activator, thereby causing the color changing dye to revert to its colorless form, and thus also causing the irreversible thermochromic ink to adopt a different color and/or to become substantially colorless.

The irreversible thermochromic inks in accordance with any of the aspects of the disclosure can be designed for any applicator. For example, the ink can be used in writing instruments such as ball point pens, fountain pens, felt-tip pens, and markers. The ink can also be used in stamping applicators. In embodiments where the irreversible thermochromic inks include thermochromic pigment capsules, the particle size (or diameter) of the capsules can vary in different applicators. For example, the irreversible thermochromic ink compositions for use in ball pens, thermochromic pigment capsules having a diameter of between about 0.1 microns and about 5 microns, between about 0.1 microns and about 3 microns, and/or between about 0.1 microns and 2 microns are highly desirable. For thermochromic ink compositions for use in markers, thermochromic pigment capsules having a diameter between about 1 micron and about 50 microns, between about 1 micron and about 30 microns, between about 1 micron and about 15 microns and/or between about 1 micron and about 10 microns can be used. For thermochromic ink compositions for use with stamps, capsules having a diameter in excess of 100 microns are typically preferred, for example, thermochromic pigment capsules having a diameter between about 100 microns and about 500 microns.

In one aspect, the writing instrument includes an irreversible thermochromic ink comprising a carrier and thermochromic pigment capsules dispersed in the carrier. The irreversible thermochromic pigment capsules comprise an inner core, an outer core, and a shell. The inner core comprises a color changing dye and a color activator mixed with/distributed in a wax. The outer core comprises a color destroying agent. Because of the capability of the (at least one) wax to maintain chemical separation between the activated color changing dye of the inner core and the color destroying agent of the outer core, the outer core can be provided in liquid, semi-solid, or solid form as long as its composition is substantially immiscible with that of the inner core.

In another aspect, the writing instrument includes an irreversible thermochromic ink comprising a carrier and thermochromic pigment capsules dispersed in the carrier. The irreversible thermochromic pigment capsules comprise an inner core, an outer core, and a shell. The inner core comprises a color destroying agent mixed with/distributed in a wax. The outer core comprises a color changing dye and a color activator. Because of the capability of the (at least one) wax to maintain chemical separation between the activated color changing dye of the outer core and the color destroying agent of the inner core, the outer core can be provided in liquid, semi-solid, or solid form as long as its composition is substantially immiscible with that of the inner core.

In yet another aspect, the writing instrument includes an irreversible thermochromic ink comprising a carrier, a color destroying agent dissolved or dispersed in the carrier, and a wax-based composition dispersed in the carrier. The wax-based composition includes a color changing dye and a color activator mixed with/distributed in a wax as described above (i.e., with respect to inner core 12 above). Because of the capability of the (at least one) wax to maintain chemical separation between the activated color changing dye of the carrier and the wax-based composition comprising the color destroying agent, the wax-based composition can be present in the carrier without encapsulation as the wax-based composition is substantially immiscible with the carrier.

In yet another aspect, the writing instrument includes an irreversible thermochromic ink comprising a color destroying agent and a wax-based composition dispersed in the color destroying agent. The wax-based composition includes a color changing dye and a color activator mixed with/distributed in a wax as described above (i.e., with respect to inner core 12 above). Because of the capability of the (at least one) wax to maintain chemical separation between the activated color changing dye of the carrier and the wax-based composition comprising the color destroying agent, the wax-based composition can be present in the carrier without encapsulation as the wax-based composition is substantially immiscible with the carrier.

In yet another aspect, the writing instrument includes an irreversible thermochromic ink comprising carrier, a color changing dye and a color activator dissolved or dispersed in the carrier, and a wax-based composition dispersed in the carrier. The wax-based composition includes the color destroying agent mixed with/distributed in the wax as described above (i.e., with respect to inner core 22 above). Because of the capability of the (at least one) wax to maintain chemical separation between the activated color changing dye of the carrier and the wax-based composition comprising the color destroying agent, the wax-based composition can be present in the carrier without encapsulation as the wax-based composition is substantially immiscible with the carrier.

As used herein, the term "irreversible thermochromic" refers to an ink composition or an ink capsule that is capable of undergoing a color change and/or becoming substantially colorless, such that the change cannot be reversed/restored by application of a temperature change. As a result, the disclosed thermochromic ink compositions and ink capsules cannot exhibit hysteresis (at least upon melting of the wax and interaction of the activated color changing dye and the color destroying agent) and are therefore advantageously considered to be permanently erasable.

A written marking can be made with the irreversible thermochromic ink composition on a substrate and then rendered a different color or substantially colorless, for example, by an erasure process. The erasure process can include the application of heat, for example by application of frictional forces to the marking, so as to effect heating at the area of contact and thereby increase the temperature of the irreversible thermochromic pigment capsules and/or the wax-based compositions to a temperature most typically in excess of the melting point of the wax to allow for facile combination of the activated color changing dye and the color destroying agent as described above, and also to rupture any irreversible thermochromic capsules present in the written markings (when frictional forces are applied). The marking will become substantially colorless upon interaction of the color destroying agent and the activated color changing dye. Frictional forces can be applied, for example, using a force directing component such as a conventional eraser. Any material capable of applying a friction force to a substrate can be a suitable force directing component to rupture and/or heat the irreversible thermochromic pigment capsules, including but not limited to (relatively harder) thermoplastic materials, thermoplastic elastomers, metals, and wood can be used. Alternatively, the erasure process can include heating the marking without or in combination with the application of a friction force. The marking can be heated in any known way including directing a light or laser thereon, directing heated air thereover, applying a heated element such as a heated block element (e.g., an ironing element), etc.

In one aspect, a method of erasing a written mark includes (i) making a written mark on a substrate with an irreversible thermochromic ink comprising a carrier and thermochromic pigment capsules dispersed in the carrier, the irreversible thermochromic pigment capsules comprising an inner core comprising a color changing dye and a color activator dispersed in a wax, an outer core comprising a color destroying agent, and a shell, the written mark providing a coating comprising a plurality of the irreversible thermochromic pigment capsules on the substrate, and (ii) applying heat to the written mark in an amount sufficient to melt or liquefy the wax of the inner core, thereby allowing the activated color changing dye (i.e., the complex formed by the color changing dye and the color activator) to interact with the color destroying agent, thus causing the color changing dye to revert to its colorless form, and thus also causing the written mark to adopt a different color and/or substantially colorless.

In another aspect, a method of erasing a written mark includes (i) making a written mark on a substrate with an irreversible thermochromic ink comprising a carrier and thermochromic pigment capsules dispersed in the carrier, the irreversible thermochromic pigment capsules comprising an inner core comprising a color destroying agent dispersed in a wax, an outer core comprising a color changing dye and a color activator, and a shell, the written mark providing a coating comprising a plurality of the irreversible thermochromic pigment capsules on the substrate, and (ii) applying heat to the written mark in an amount sufficient to melt or liquefy the wax of the inner core, thereby allowing the activated color changing dye (i.e., the colored form of the color changing dye formed by/between the color changing dye and the color activator) to interact with the color destroying agent, thus causing the color changing dye to revert to its colorless form, and thus also causing the written mark to adopt a different color and/or substantially colorless.

In another aspect, a method of erasing a written mark includes (i) making a written mark on a substrate with an irreversible thermochromic ink comprising a carrier, a color destroying agent dispersed or dissolved in the carrier, a wax-based composition dispersed in the carrier and comprising a wax, a color changing dye, and a color activator (the color changing dye and the color activator are dispersed in the wax), and (ii) applying heat to the written mark in an amount sufficient to melt or liquefy the wax of the wax-based composition, thereby allowing the activated color changing dye (i.e., the colored form of the color changing dye formed by/between the color changing dye and the color activator) to interact with the color destroying agent, thus causing the color changing dye to revert to its colorless form, and thus also causing the written mark to adopt a different color and/or substantially colorless.

In another aspect, a method of erasing a written mark includes (i) making a written mark on a substrate with an irreversible thermochromic ink comprising a color destroying agent and a wax-based composition dispersed in the color destroying agent and comprising a wax, a color changing dye, and a color activator (the color changing dye and the color activator are dispersed in the wax), and (ii) applying heat to the written mark sufficient to melt or liquefy the wax of the wax-based composition, thereby allowing the activated color changing dye (i.e., the colored form of the color changing dye formed by/between the color changing dye and the color activator) to interact with the color destroying agent, thus causing the color changing dye to revert to its colorless form, and thus also causing the written mark to adopt a different color and/or substantially colorless. In this aspect, the color destroying agent also serves as the carrier for the ink composition. The carrier can further include small amounts of functional solvents (such as a humectant), a resin, or a mixture thereof.

In yet another aspect, a method of erasing a written mark includes (i) making a written mark on a substrate with an irreversible thermochromic ink comprising a carrier, a color changing dye and a color activator dispersed or dissolved in the carrier, a wax-based composition dispersed in the carrier and comprising a wax and a color destroying agent (the color destroying agent being dispersed in the wax), and (ii) applying heat to the written mark sufficient to melt or liquefy the wax of the wax-based composition, thereby allowing the activated color changing dye (i.e., the colored form of the color changing dye formed by/between the color changing dye and the color activator) to interact with the color destroying agent, thus causing the color changing dye to revert to its colorless form, and thus also causing the written mark to adopt a different color and/or substantially colorless Color Changing Dye As used herein, the term "color changing dye" refers to a dye, such as a leuco dye, which can exhibit a first color in the presence of a color activator (by formation of the previously referenced activated color changing dye) and exhibits a second color or become substantially colorless when the color activator is not present or is deactivated. As a result, when in the presence of the color activator, the color change dye is generally in its colored form at room temperature. The color-change from colored to a different color and/or substantially colorless can result from electron transfer and/or proton transfer reactions. For example, the change in color can be induced by cleaving a lactone ring to form a more highly conjugated species that absorbs light in the visible range.

Suitable dyes include, but are not limited to, dyes such as xanthene leuco dyes, thioxanthene leuco dyes, acridine leuco dyes, phenoxazine leuco dyes, phenazine leuco dyes, merocyanine leuco dyes, thiazine leuco dyes, oxazine leuco dyes, azine leuco dyes, methine leuco dyes, azo leuco dyes, pyrazoline leuco dyes, stilbene leuco dyes, coumarin leuco dyes, triarylmethane leuco dyes (including but not limited to phenylmethanes such as diphenylmethanes, triphenylmethanes, aminotriarylmethanes, and bisphenylmethanes), spiropyran leuco dyes, phthalide leuco dyes (including but not limited to diarylphthalides and indolylphthalides), fluoran leuco dyes, acylleucoazine dyes, leucoauramine dyes, rhodaminelactam leuco dyes, chromene leuco dyes, quinine leuco dyes, aminohydrocinnamic acid leuco dyes (including but not limited to cyanoethanes and leuco methines) and their corresponding esters, 2-(p-hydroxyphenyl)-4,5-diphenylimidazole leuco dyes, indanone leuco dyes, indamine leuco dyes, hydrozine leuco dyes, indigoid leuco dyes, amino-2,3-dihydroanthraquinone leuco dyes, tetrahalo-p,p'-biphenol leuco dyes, phenethylaniline leuco dyes, and mixtures thereof.

Exemplary fluoran based leuco dyes include, for example, 3-diethylamino-6-methyl-7-anilinofluoran; 3-(N-ethyl-p-toluidino)-6-methyl-7-anilinofluoran; 3-(N-ethyl-N-isoamylamino)-6-methyl-7-anilinofluoran; 3-diethylamino-6-methyl-7-(o,p-dimethylanilino) fluoran; 3-pyrrolidino-6-methyl-7-anilinofluoran; 3-pi-6-methyl-7-anilinofluoran; 3-(N-cyclohexyl-N-methylamino)-6-methyl-7-anilinofluoran; 3-diethylamino-7-(m-trifluoromethylanilino)fluoran; 3-dibutylamino-6-methyl-7-anilinofluoran; 3-diethylamino-6-chloro-7-anilinofluoran; 3-dibutylamino-7-(o-chloroanilino) fluoran; 3-diethylamino-7-(o-chloroanilino) fluoran; 3-di-n-pentylamino-6-methyl-7-anilinofluoran; 3-di-n-butylamino-6-methyl-7-anilinofluoran; 3-(n-ethyl-n-isopentylamino)-6-methyl-7-anilinofluoran; 3-pyrrolidino-6-methyl-7-anilinofluoran; 1 (3H)-isobenzofuranone,4,5,6,7-tetrachloro-3,3-bis[2-[4-(dimethylamino)phenyl]-2-(4-methoxyphenyl)ethenyl]; and mixtures thereof.

Exemplary aminotriarylmethane leuco dyes include, for example, tris(N,N-dimethylaminophenyl)methane (LCV); deutero-tris(N,N-dimethylaminophenyl)methane (D-LCV); tris(N,N-diethylaminophenyl)methane (LECV); deutero-tris (4-diethylaminophenyl)methane (D-LECV); tris(N,N-di-n-propylaminophenyl)methane (LPCV); tris(N,N-di-n-buty) aminophenyl)methane (LBCV); bis(4-diethylaminophenyl)-(4-diethylamino-2-methy)-phenyl)methane (LV-1); bis(4-diethylamino-2-methylphenyl)-(4-diethylamino-phenyl) methane (LV-2); tris(4-diethylamino-2-methylphenyl) methane (LV-3); deutero-bis(4-diethylaminophenyl)-(4-diethylamino-2-methylphenyl)methane (D-LV-1); deutero-bis(4-diethylamino-2-methylphenyl)(4-diethylaminophenyl)methane (D-LV-2); bis(4-diethylamino-2-methylphenyl)(3,4-dimethoxyphenyl)methane (LB-8); aminotriarylmethane leuco dyes having different alkyl substituents bonded to the amino moieties wherein each alkyl group is independently selected from C1-C4 alkyl; and aminotriarylmethane leuco dyes based on any of the preceding structures that are further substituted with one or more alkyl groups on the aryl rings wherein the latter alkyl groups are independently selected from C1-C3 alkyl.

Suitable color changing dyes are commercially available under the PERGASCRIPT® trade name (Ciba-Geigy Corporation, Greensboro, N.C.) and under the COPIKEM® trade name (Hilton Davis Company, Cincinnati, Ohio). Specific exemplary color change dyes include crystal violet lactone, malachite green lactone, PERGASCRIPT® red I-6B (a bisindolyl phthalide dye), PERGASCRIPT® black I-2R (a diamino fluoran dye), PERGASCRIPT® I-2G (a xanthene dye), COPIKEM® 1 Blue CVL (crystal violet lactone), Vermilion-DCF (Hodogaya Chemical (USA) Inc.), Red-DCF (Hodogaya Chemical (USA) Inc.), and Orange-DCF (Hodogaya Chemical (USA) Inc.).

A number of leuco dyes and their chemistries are disclosed in Muthyala, "Chemistry and Application of Leuco Dyes," Topics in Applied Chemistry, Plenum Press, New York (1997), which is incorporated herein by reference in its entirety. Additional color changes dyes are disclosed, for example, in U.S. Pat. No. 3,658,543 and U.S. Pat. No. 6,251,571, each of which is also incorporated herein by reference in its entirety.

In another aspect, when the color changing dye is present in a thermochromic pigment capsule or thermochromic ink, the color changing dye can be a pH sensitive dye that is colored under either basic or acidic conditions, and changes from colored to substantially colorless according to a local change in pH. In embodiments of the disclosure, the local change in either acid concentration or base concentration is generally caused by interaction of the color activator with a color destroying agent comprising an acid or a base.

Suitable pH sensitive dyes that are colored under basic conditions include, for example, phthalein-type dyes, such as o-cresolphthalein, phenolphthalein, and thymolphthalein, and phenol-type dyes, such as m-nitrophenol and p-nitrophenol, cyanine, and bis-(2,4-dinitro-phenyl)acetic acid ethyl ester. Color destroying agents comprising one or more acids can be used in combination with the foregoing pH sensitive dyes.

Suitable pH sensitive dyes that are colored under acidic conditions include, for example, phthalide-type color-forming dyes, such as diarylphthalide dyes and indolylphthalide dyes, fluoran dyes, leuco dyes, such as acylleucoazine dyes and leucoauramine dyes, spiropyrane dyes, rhodaminelactam dyes, triarylmethane dyes, and chromene dyes. Color destroying agents comprising one or more bases can be used in combination with the foregoing pH sensitive dyes.

Typically, the irreversible thermochromic ink pigment capsules, the wax-based compositions which include the color changing dye (and are not encapsulated), or the carrier of the irreversible thermochromic ink compositions which include the color changing dye (i.e., the irreversible thermochromic ink compositions including wax-based compositions having the color destroying agent mixed with/distributed in the wax) include at least 1 weight percent (wt. %), at least 5 wt. %, and/or at least 10 wt. % of the color changing dye based on the total weight of the irreversible thermochromic pigment ink capsules, the wax-based compositions, or the irreversible thermochromic ink composition, respectively. For example, the amount of color changing dye present in the irreversible thermochromic ink pigment capsules, the wax-based compositions which include the color changing dye (and are not encapsulated), or the carrier of the irreversible thermochromic ink compositions which include the color changing dye (i.e., the irreversible thermochromic ink compositions including wax-based compositions having the color destroying agent mixed with/distributed in the wax) is typically between about 1 wt. % and about 25 wt. %, about 2.5 wt. % and about 20 wt. %, about 2 wt. % and about 18 wt. %, about 4 wt. % and about 16 wt. %, about 5 wt. % and about 17.5 wt. %, about 6 wt. % and about 14 wt. %, and/or about 8 wt. % and about 12 wt. %, based on the total weight of the irreversible thermochromic pigment ink capsules, the wax-based compositions, or the irreversible thermochromic ink composition, respectively. Other suitable amounts of the color changing dye in the irreversible thermochromic ink pigment capsules, the wax-based compositions which include the color changing dye (and are not encapsulated), or the carrier of the irreversible thermochromic ink compositions which include the color changing dye (i.e., the irreversible thermochromic ink compositions including wax-based compositions having the color destroying agent mixed with/distributed in the wax) include about 1, 2, 3, 4, 5, 6, 7, 8, 9, 10, 11, 12, 13, 14, 15, 16, 17, 18, 19, 20, 21, 22, 23, 24, and 25 wt. % based on the total weight of the irreversible thermochromic pigment ink capsules, the wax-based compositions, or the irreversible thermochromic ink composition, respectively. The amount of color changing dye in the ink compositions may be adjusted, for example, to increase color density as desired, particularly in view of the transparency/translucency of the irreversible thermochromic capsule shell (if encapsulated).

Color Activator

As used herein, the term "color activators" refers to any compound or mixture of compounds that causes a color changing dye to exhibit a color when in the presence of the color activator (by formation of the previously referenced activated color changing dye). Thus, the color changing dye is substantially colorless in the absence of the color activator or when the color activator is deactivated. For example, when the color changing dye is a leuco dye, the color activator can include an acidic proton to activate the leuco dye.

Suitable color activators include, for example, phenolic compounds (i.e., compounds including a phenolic moiety).

The phenolic compounds can be substituted, for example, with an alkyl moiety (which may be straight chained or branched) or an aryl moiety. The alkyl or aryl moieties can include one or more substituents selected from the group consisting of nitro, cyano, amino, hydroxyl, halogen, alkyl, haloalkyl, alkoxyalkyl groups, aryloxy groups and alkoxy groups. Exemplary color activators include, but are not limited to, for example, p-cresol; m-cresol; o-cresol; p-ethylphenol; m-ethylphenol; o-ethylphenol; p-octylphenol; p-tert-butylphenol; 1,1-bis(p-hydroxyphenyl)propane; 2,2-bis(p-hydroxyphenyl)propane; 1,1-bis(p-hydroxyphenyl) cyclohexane; 4,4-thiobisphenol; 4,4-sulfonyldiphenol; bis(3-allyl 4-hydroxphenyl)sulfone; nonylphenol; 4-tert-amylphenol; 2-phenylphenol; 3-(hydroxymethyl)phenol; 4-(hydroxymethyl)phenol; 4-hydroxy-3-methoxybenzaldehyde; and 1-(4-hydroxy-3-methoxyphenyl)ethanone. Other useful color activators including a phenolic moiety include but are not limited to vanillins (including various derivatives thereof), (other) cresols (including derivatives thereof), xylenols (including derivatives thereof), trimethylphenols (including derivatives thereof), napthols (including derivatives thereof), halogen substituted-phenols (including various derivatives thereof), and the like.

Typically, the irreversible thermochromic ink pigment capsules, the wax-based compositions which include the color activator (and are not encapsulated), or the carrier of the irreversible thermochromic ink compositions which include the color activator (i.e., the irreversible thermochromic ink compositions including wax-based compositions having the color destroying agent mixed with/distributed in the wax) include at least 1 wt. %, at least 5 wt. %, at least 10 wt. %, and/or at least 20 wt % of the color activator based on the total weight of the irreversible thermochromic pigment ink capsules, the wax-based compositions, or the irreversible thermochromic ink composition, respectively. For example, the amount of the color activator present in the irreversible thermochromic ink pigment capsules, the wax-based compositions which include the color activator (and are not encapsulated), or the carrier of the irreversible thermochromic ink compositions which include the color activator (i.e., the irreversible thermochromic ink compositions including wax-based compositions having the color destroying agent mixed with/distributed in the wax) is typically between about 1 wt. % and about 55 wt. %, about 5 wt. % and about 50 wt. %, about 10 wt. % and about 45 wt. %, about 2 wt. % and about 18 wt. %, about 4 wt. % and about 16 wt. %, about 6 wt. % and about 14 wt. %, and/or about 8 wt. % and about 12 wt. %, based on the total weight of the irreversible thermochromic pigment ink capsules, the wax-based compositions, or the irreversible thermochromic ink composition. Other suitable amounts of the color activator in the irreversible thermochromic ink pigment capsules, the wax-based compositions which include the color activator (and are not encapsulated), or the carrier of the irreversible thermochromic ink compositions which include the color activator (i.e., the irreversible thermochromic ink compositions including wax-based compositions having the color destroying agent mixed with/distributed in the wax) include about 1, 2, 3, 4, 5, 6, 7, 8, 9, 10, 11, 12, 13, 14, 15, 16, 17, 18, 19, 20, 25, 30, 35, 40, 45, 50, and 55 wt. % based on the total weight of the irreversible thermochromic pigment ink capsules, the wax-based compositions, or the irreversible thermochromic ink composition. Like the amount of color changing dye, the amount of the color activator may be adjusted, for example, to increase color density as desired, particularly in view of the transparency of the irreversible thermochromic capsule shell (if encapsulated). To achieve a substantial degree of color activation, the weight ratio of color activator to color changing dye in the irreversible thermochromic pigment ink capsules, the wax-based compositions, or in the carrier of the irreversible thermochromic ink compositions (i.e., the irreversible thermochromic ink compositions including wax-based compositions having the color destroying agent mixed with/distributed in the wax) is preferably at least 1:1, for example, at least 2:1, at least 3:1, and/or at least 4:1.

Color Destroying Agent

As used herein, the term "color destroying agent" refers to any compound or mixtures of compounds that disrupts the interaction of the color activator and the color changing dye in the activated color changing dye, for example, upon mixing with the activated color changing dye, thereby changing the color of the color changing dye or rendering the color changing dye substantially colorless. Preferably, the color destroying agent exhibits strong solvency towards the color changing dye and the color activator (and the activated color changing dye formed therebetween). The color destroying agent should not, however, dissolve or solvate the wax or the shell material. The color destroying agent can be, for example, a solvent, a mixture of compatible solvents, a resin, resin combinations, and combinations thereof. In embodiments of the disclosure in which the color destroying agent is mixed with (and thereby dissolved/dispersed in) a wax, the color destroying agent should be sufficiently compatible with the wax so as not to leach out from the wax until the melting point of the wax is reached or exceeded.

Suitable color destroying agents include, for example, esters, dibasic esters, ethers, alcohols, polyhydric alcohols, ketones, sulfolanes, sulfones, sulfoxides, carbonates, formates, silicones, and amines.

Suitable alcohols include, for example, ethanol, propanol, butanol, n-octyl alcohol, n-nonyl alcohol, n-decyl alcohol, n-lauryl alcohol, n-myristyl alcohol, n-cetyl alcohol, n-stearyl alcohol, n-eicosyl alcohol, n-docosyl alcohol, n-melissyl alcohol, isocetyl alcohol, isostearly alcohol, isodocosyl alcohol, oleyl alcohol, cyclohexanol, cyclopentanol, benzyl alcohol, and cinnamoyl alcohol.

Suitable esters include, for example, ethyl acetate, amyl acetate, octyl acetate, butyl propionate, octyl propionate, phenyl propionate, ethyl caproate, amyl caproate, ethyl caprylate, amyl caprylate, ethyl pelargonate, butyl pelargonate, hexyl pelargonate, ethyl caprate, amyl caprate, octyl caprate, methyl laurate, ethyl laurate, butyl laurate, hexyl laurate, octyl laurate, dodecyl laurate, cetyl laurate, stearyl laurate, methyl myristate, ethyl myristate, butyl myristate, hexyl myristate, octyl myristate, lauryl myristate, myristyl myristate, cetyl myristate, stearyl myristate, methyl palmitate, ethyl palmitate, butyl palmitate, hexyl palmitate, octyl palmitate, lauryl palmitate, myristyl palmitate, cetyl palmitate, stearyl palmitate, methyl stearate, ethyl stearate, butyl stearate, hexyl stearate, octyl stearate, touryl stearate, myristyl stearate, cetyl stearate, stearyl stearate, methyl behenate, ethyl behenate, propyl behenate, butyl behenate, ethyl benzoate, butyl benzoate, amyl benzoate, phenyl benzoate, ethyl acetoacetate, methyl oleate, butyl oleate, butyl acrylate, diethyl oxalate, dibutyl oxalate, dimethyl malonate, diethyl malonate, dibutyl malonate, dibutyl tartrate, dimethyl cebacate, dibutyl cebacate, dimethyl phthalate, dibutyl phthalate, dioctyl phthalate, dibutyl fumarate, diethyl citrate, and triethyl citrate.

The color destroying agent can be, for example, a dibasic ester. Suitable dibasic esters include, for example, distearyl oxalate, dieicosyl oxalate, behenyl oxalate, distearyl succinate, eicosyl succinate, behenyl succinate, distearyl glutarate, dieicosyl glutarate, behenyl glutarate, dimyristyl adipate, dicetyl adipate, distearyl adipate, eicosyl adipate, behenyl adipate, dicetyl suberate, distearyl suberate, dieicosyl suberate, behenyl suberate, myristyl azelate, dicetyl azelate, distearyl azelate, eicosyl azelate, behenyl azelate, dimyristyl sebacate, dicetyl sebacate, distearyl sebacate, dieicosyl sebacate, dibehenyl sebacate, ditridecyl 1,14-tetradecamethylenedicarboxylate, dimyristyl 1,14-tetradecamethylenedicarboxylate, dicetyl 1,14-tetradecamethylenedicarboxylate, dipalmityl 1,14-tetradecamethylenedicarboxylate, distearyl 1,14-tetradecamethylenedicarboxylate, dieicosyl 1,14-tetradecamethylenedicarboxylate, dibehenyl 1,14-tetradecamethylenedicarboxylate, dilauryl 1,16-hexadecamethylenedicarboxylate, ditridecyl 1,16-hexadecamethylenedicarboxylate, dimyristyl 1,16-hexadecamethylenedic-arboxylate, dicetyl 1,16-hexadecamethylenedicarboxylate, dipalmityl 1,16-hexadecamethylenedicarboxylate, distearyl 1,16-hexadecamethylenedicarboxylate, dieicosyl 1,16-hexadecamethylenedicarboxylate, dibehenyl 1,16-hexadecamethylenedicarboxylate, didecyl 1,18-octadecamethylenedicarboxylate, dilauryl 1,18-octadecamethylenedicarboxylate, ditridecyl 1,18-octadecamethylenedicarboxylate, dimyristyl 1,18-octadecamethylenedicarboxylate, dicetyl 1,18-octadecamethylenedicarboxylate, dipalmityl 1,18-octadecamethylenedicarboxylate, distearyl 1,18-octadecamethylenedicarboxylate, dieicosyl 1,18-octadecamethylenedicarboxylate, dibehenyl 1,18-octadecamethylenedicarboxylate, didecyl 1,20-eicosylmethylenedicarbo-xylate, dilauryl 1,20-eicosylmethylenedicarboxylate, ditridecyl 1,20-eicosylmethylenedicarboxylate, dimyristyl 1,20-eicosylmethylenedicar-boxylate, dicetyl 1,20-eicosylmethylenedicarboxylate, dipalmityl 1,20-eicosylmethylenedicarboxylate, distearyl 1,20-eicosylmethylenedicarboxylate, dieicosyl 1,20-eicosylmethylenedicarboxylate, dibehenyl 1,20-eicosylmethylenedicarboxylate, trimyristin, tripalmitin, tristearin, trinonadecanoin, cholesterol caproate, cholesterol caprylate, cholesterol caprate, cholesterol undecanoate, cholesterol laurate, cholesterol myristate, cholesterol palmitate, cholesterol stearate, cholesterol eicosanate, and cholesterol behenate.

Esters containing more than two ester functionalities in the molecule can also be used as the color destroying agent. For example, a fat or oil can be used. The fat and oil can be of either plant or animal origin. For example, the color destroying agent can be sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. In a preferred embodiment, the color destroying agent is coconut oil. Without intending to be bound by theory, it is believed that coconut oil is an effective color destroying agent because of its ability to effectively penetrate and thereby disrupt the interaction between the color changing dye and the color activator that provides the activated color changing dye (in its colored form).

Exemplary ethers include, for example, diethylene glycol dimethyl ether, diphenyl ether, distearyl ether, butyl ether, hexyl ether, diisopropyl benzyl ether, ethylene glycol dibutyl ether, diethylene glycol dibutyl ether, ethylene glycol diethyl ether, ethylene glycol diphenyl ether, ethylene glycol monophenyl ether.

Suitable modified silicones include, for example, silicone polyethers or silicone glycols, such as dimethicone copolyol; silicone alkyl-inked polyethers, such as GOLDSCHMIDT ABIL EM-90 or GOLDSCHMIDT ABIL EM-97); siloxane surfactants of a pendant, rake, or comb configuration; silicone surfactants of a trisiloxane configuration; silicone surfactants of ABA/alpha-omega block copolymers, such as polyoxyalkylenes, polyoxyethylene or ethoxylated, polyoxypropylene or oxypropylene, polyoxyethylene/polyoxypropylene or ethoxylated/propoxylated); aromatic substituted silicone emollients, such as phenyl, alpha-methyl styryl, styryl, methylphenyl, alkylphenyl; silicone copolymers with other functional groups including hydrogen, hydroxyl, hydroxyalkyl, polyhydroxy alkyl, alkyl, methyl, amino, trifluoropropyl, vinyl, alkoxy, arylalkyl, aryl, phenyl, styryl, polyethers, esters, carboxylics; nonionic functional siloxane copolymers with terminal groups being silanol or trimethylsiloxy; nonionic functional siloxanes with backbone groups being trisiloxane or methicone linked; nonionic silicone surfactants; tetraethoxysilane; tetramethoxysilane; hexamethoxysilicone; oxymethoxytrisiloxane; silicone emulsifiers; silicone or siloxane resins; alkyl silicone resins; polyoxyalkylene silicone resins; MQ resins, alkoxysiloxanes; alkoxysilanes; methicones; and combinations thereof.

The following modified silicones available from Dow Corning are also suitable for use as the color destroying agent: DC-556 Cosmetic Grade Fluid (phenyl trimethicone); DC-704 Diffusion Pump Fluid (Tetramethyl-Tetraphenyl-Trisiloxane); DC-705 Diffusion Pump Fluid; DC-1784 Emulsion; DC-AF Emulsion; DC-1520; DC-593 Fluid (Dimethicone and Trimethylsiloxysilicate); DC-3225C or DC-5225C Fluid (Cyclomethicone and Dimethicone Copolyol); DC-190 Fluid (Dimethicone Copolyol); DC-193 Fluid (Dimethicone Copolyol); BY-11-030 (Cyclomethicone and Dimethicone Copolyol); DC-1732, DC-5732, DC-5750, DC-1401 (Cyclomethicone and Dimethiconol); DC-5200 Fluid (Laurylmethicone Copolyol); DC-6603 Polymer Powder; DC-5640 Powder; DC-Q2-5220 (Dimethicone Copolyol); DC Q2-5324 (Dimethicone Copolyol); DC-1-3563 (Dimethiconol); DC-X2-1286 (Dimethiconol); DC-X2-1146A (Cylcomethicone and Dimethiconol); DC-8820 Fluid (Amino functionalized); DC-Q2-8220 (Trimethylsilyl-amodimethicone); DC-7224 (Trimethylsilylamo-dimethicone); DC-X2-1318 Fluid (Cyclomethicone and Vinyldimethicone); DC-QF1-3593A fluid (Trimethylsiloxysilicate); and combinations thereof.

The following modified silicones available from General Electric are suitable for use as the color destroying agent: GE SF-1023 (Dimethyl-Diphenyl-Siloxane); GE SF-1066, GE CF-1142 (Methylphenyl Siloxane Fluid); GE SF-1153 (Dimethyl-Diphenyl-Siloxane); GE SF-1265 (Diphenyl-Dimethyl-Siloxane); GE SF-1188 (Dimethicone copolyol); GE SF-1188A (Silicone polyether copolymer); GE SF-1288 (silicone polyether copolymer, dimethyl-methyl 3-hydroxypropyl ethoxylated siloxane); GE SF-1318 (methylester siloxane); GE SF-1328 (silicone surfactant, dimethyl-methyl 3-hydroxypropyl ethoxylated-propoxylated siloxane); GE SF-1550 (methylphenyl siloxane, hexamethyl-3-phenyl-3-[[trimethylsilyl]oxy]trisiloxane); GE SS-4267 (Dimethicone and Trimethylsiloxysilicate) and combinations thereof.

Additional examples of modified silicones for use as the color destroying agent include, for example, MASIL 756 from PPG Specialty Chemicals (Tetrabutoxypropyl Trisiloxane); bis-phenylhexamethicone (available as SILBIONE OILS 70633 V30 from Rhone-Poulenc); SILBIONE OILS 70646 (dimethicone copolyols from Rhone-Poulenc); Unisil SF-R (dimethiconol from UPI); SILICATE CLUSTER from Olin (Tris[tributoxysiloxy]methylsilane); silicone copolymer F-754 (dimethicone copolyol from SWS Silicones); and combinations thereof.

The color destroying agent can be included in the irreversible thermochromic ink pigment capsules, the wax-based compositions which include the color destroying agent (and are not encapsulated), or the carrier of the irreversible thermochromic ink compositions which include the color destroying agent (i.e., the irreversible thermochromic ink compositions including wax-based compositions having the color changing dye and the color activator mixed with/distributed in the wax) in amount of about 5 wt. % to about 80 wt. %, about 10 wt. % to about 70 wt. %, about 20 wt. % to about 60 wt. %, or about 30 wt. % to about 60 wt. % based on the total weight of the irreversible thermochromic pigment ink capsules, the wax-based compositions, or the irreversible thermochromic ink composition, respectively. Other suitable amounts of the color destroying agent in the irreversible thermochromic ink pigment capsules, the wax-based compositions which include the color destroying agent (and are not encapsulated), or the carrier of the irreversible thermochromic ink compositions which include the color destroying agent (i.e., the irreversible thermochromic ink compositions including wax-based compositions having the color changing dye and the color activator mixed with/distributed in the wax) include, for example, about 5, 10, 15, 20, 25, 30, 35, 40, 45, 50, 55, 60, 65, 70, 75, and 80 wt. % based on the total weight of the irreversible thermochromic pigment ink capsules, the wax-based compositions, or the irreversible thermochromic ink composition, respectively.

Wax

The wax is included in the irreversible thermochromic capsules or in the irreversible thermochromic ink composition (when not encapsulated) to chemically separate the activated color changing dye (i.e., the colored form of the color changing dye formed by/between the color changing dye and the color activator) from the color destroying agent.

In one embodiment, the color changing dye and the color activator are combined with the wax to form the inner core of a thermochromic pigment capsule. In this embodiment, the wax chemically separates the activated color changing dye from the color destroying agent, which is provided in an outer core surrounding the inner core.

In another embodiment, the color changing dye and the color activator are combined with the wax to form a wax-based composition which is dispersed or dissolved in a carrier of a thermochromic ink, as described above. In this embodiment, the wax chemically separates the activated color changing dye from the color destroying agent present in the carrier.

In another embodiment, the color destroying agent is combined with the wax to form the inner core of a thermochromic pigment capsule. In this embodiment, the wax chemically separates the color destroying agent from the activated color changing dye, which is provided in an outer core surrounding the inner core.

In another embodiment, the color destroying agent is combined with the wax to form a wax-based composition which is dispersed or dissolved in a carrier of a thermochromic ink, as described above. As in the other embodiments, the wax chemically separates the color destroying agent of the carrier from the activated color changing dye.

In each embodiment, the elements contained in the inner core or wax-based composition (either the color changing agent and the color activator, or the color destroying agent) are mixed with the wax, for example, when the wax is in a molten or melted state. Preferably, the elements of the inner core or wax-based composition are homogenously mixed with/distributed in the wax. The wax mixture is then cooled to form a solid structure in which the elements of the inner core or wax-based composition are incorporated (e.g., dispersed) throughout a wax matrix. The molten material can be introduced into a mold to provide appropriately sized inner (solid) cores or wax-based compositions. Alternatively, the solid core can be processed as needed in accordance with conventional techniques to provide appropriately sized inner cores or wax-based compositions.

The wax should have a melting point such that the wax will not melt in the environment in which the irreversible thermochromic pigment capsules or thermochromic inks are being used, for example, at ambient temperature, but that will melt or sufficiently liquefy upon application of heat, for example the heat generated upon application of forces produced during an erasure process, to thereby allow for chemical contact between the activated color changing dye and the color destroying agent. For example, the wax can have a melting point in excess of 50° C., in excess of 55° C., and/or in excess of 60° C. For example, the wax can have a melting point of about 50° C. to about 120° C., about 60° C. to about 110° C., about 80° C. to about 120° C., about 90° C. to about 110° C., and/or about 70° C. to about 100° C. Other suitable waxes can have melting points including, for example, about 50° C., 55° C., 60° C., 65° C., 70° C., 75° C., 80° C., 85° C., 90° C., 95° C., 100° C., 105° C., 110° C., 115° C., and 120° C.

Suitable waxes include, for example, paraffin wax, refined or fully refined paraffin wax, slack wax, scale wax, microcrystalline wax, polyethylene wax, polypropylene wax, petrolatum, white oils, and recycled wax. Waxes from plant or animal origins can also be used. Examples of plant waxes include barberry wax, palm wax, soybean wax, Montan wax, rice wax, carnauba wax, Japan wax, and candelilla wax and the like. Examples of animal waxes include bees wax, lanolin, and whale wax. Combinations of the foregoing waxes may also be used.

The wax is generally included in the irreversible thermochromic pigment capsules and/or the wax-based compositions of the irreversible thermochromic ink composition in an amount of about 20 wt. % to about 90 wt. %, about 30 wt. % to about 80 wt. %, about 40 wt. % to about 70 wt. %, or about 50 wt. % to about 60 wt. % based on the total weight of the components that form the inner core of the capsule (if encapsulated) or based on the total weight of the components that form the wax-based compositions (when not encapsulated). Other suitable amounts include, for example, about 20, 25, 30, 35, 40, 45, 50, 55, 60, 65, 70, 75, 80, 85, and 90 wt. % based on the total weight of the components that form the inner core of the capsule (if encapsulated) or based on the total weight of the components that form the wax-based compositions (when not encapsulated).

Inner Core/Wax Based Composition Solvent

In embodiments of the disclosure in which the inner core or the waxed-based composition comprises the color destroying agent, the inner core and the wax-based composition can further include an inner core solvent to facilitate homogeneous distribution of the respective components in the wax matrix. The selected solvent preferably exhibits strong solvency for the color destroying agent. The inner core or the waxed-based composition solvent is not particularly limited, but should be selected so that the color destroying agent does not leach out from the wax matrix until the melting point of the wax is reached or exceeded. Thus, the wax maintains the chemical separation of the color destroying agent and the activated color changing dye as described above.

In embodiments of the disclosure in which the inner core or the waxed-based composition comprises the color changing dye and the color activator, the inner core and the wax-based composition can also further include an inner core solvent to facilitate homogeneous distribution of the respective components in the wax matrix. The selected solvent preferably exhibits strong solvency for the color changing dye, the color activator, and the activated color changing dye formed therebetween. The inner core or the waxed-based composition solvent should be selected so that the color changing dye and the color activator do not leach out from the wax matrix until the melting point of the wax is reached or exceeded. Thus, the wax maintains the chemical separation of the color destroying agent and the activated color changing dye as described above. Furthermore, the inner core or the waxed-based composition solvent must be selected so as not to disrupt the interaction between the color changing dye and the color activator (i.e., a solvent that functions as a color destroying agent cannot be used as the inner core or the waxed-based composition solvent).

Representative inner core or waxed-based composition solvents include but are not limited to hydrocarbons and halo-substituted hydrocarbons.

Exemplary hydrocarbons include volatile branched chain hydrocarbons having from about 4 to about 30 carbon atoms, preferably from about 4 to about 20 carbon atoms, more preferably from about 6 to about 20 carbon atoms. Such hydrocarbons include, for example, isoparaffins commercially available from Exxon Chemical Company (Baytown, Tex. U.S.A.), as ISOPAR M (C13-C14 Isoparaffin), ISOPAR C (C7-C8 Isoparaffin), ISOPAR E (C8-C9 Isoparaffin), ISOPAR G (C10-C11 Isoparaffin), ISOPAR L (C11-C13 Isoparaffin), ISOPAR H(C11-C12 Isoparaffin). Other non-limiting examples of suitable branched chain hydrocarbons are commercially available from Presperse, Inc. (South Plainfield, N.J.) as PERMETHYL 99A (isododecane), PERMETHYL 102A (isoeicosane), and PERMETHYL 101A (isohexadecane). Other non-limiting examples of suitable branched chain hydrocarbons include petroleum distillates such as those available from Phillips Chemical as SOLTROL 130, SOLTROL 170, and those available from Shell as SHELL SOL 70, SHELL SOL 71, and SHELL SOL 2033. Additional suitable hydrocarbons include dodecane, octane, decane, hydrogenated polyisobutanes and combinations thereof. For example, the NORPAR series of paraffins available from Exxon Chemical Company such as NORPAR 12, NORPAR 13, and NORPAR 15 can be used as the carrier solvent. Yet another example includes C11-C15 alkanes/cycloalkanes, such as those available from Exxon as EXXSOL™ D80.

Shell

The irreversible thermochromic pigment capsules include a shell surrounding the outer core of the capsules. The shell provides a continuous exterior surface that encapsulates and contains the inner and outer cores. The shell can be designed so as to rupture upon application of force, for example, during an erasure process. The shell therefore can be frangible and thus fabricated to rupture rather than plastically deform when pressure is applied thereto. The shell does not typically rupture into multiple fragments but does rupture (or burst) upon application of pressure such that the components therein are exposed to atmospheric conditions. As a result, upon application of a force directing component to a written mark made with an ink composition comprising thermochromic pigment capsules, a portion of the irreversible thermochromic pigment capsules are typically ruptured. Preferably, the capsules rupture under a force of less than about 25 psi (172.4 kilopascals), less than about 20 psi (137.9 kilopascals), and/or less than 10 psi (69.0 kilopascals). Alternatively, the shell can be designed so as to prevent rupture of the capsules upon application of force, for example, such as the forces generated during an erasure process.

The shell can be formed of a polymer. Exemplary polymers for the shell include, but are not limited to, polyureas, polyamides, polyesters, polyurethanes, mixtures thereof, and other similar polycondensation products, which may have optionally incorporated within their polymer structures certain soft and flexible segments such as polyether or polymethylene moiety. The shell can also be formed of other materials including but not limited to gum Arabic, gelatin, ethylcelluloses, poly(lactide)s, poly(lactide-glycolide)s (i.e., poly(lactic-co-glycolic acid), urea-formaldehyde condensates, and maltodextrins.

The shell can be about 5 wt. % to about 30 wt. %, about 10 wt. % to about 25 wt. % or about 15 wt. % to about 20 wt. % by weight of the irreversible thermochromic pigment capsule, with the inner and outer cores comprising the balance. Other suitable amounts include, for example, about 5, 6, 7, 8, 9, 10, 11, 12, 13, 14, 15, 16, 17, 18, 19, 20, 21, 22, 23, 24, 25, 26, 27, 28, 29, and 30 wt % by weight of the irreversible thermochromic pigment capsule.

The diameters of the irreversible thermochromic pigment capsules generally depend upon the application of the capsules. For example, as described above, if the capsules are to be used in an ink composition for a ball point pen, capsules having a diameter of 5 microns or less are desirable. For marker ink applications, the capsules preferably have a diameter of about 1 micron to about 50 microns. For stamping ink applications, the capsules can have a diameter in excess of 100 microns, for example, the capsules can have a diameter of about 100 microns to about 500 microns. The shell is typically formed about the outer core using known solid-in-oil-in-water emulsion microencapsulation methods, with the solid phase corresponding to the inner core, the oil phase corresponding to the outer core, and the water phase corresponding to the shell.

In a representative process, the core components which are to be encapsulated are typically emulsified or dispersed in a suitable dispersion medium to form a solid-in-oil-in-water emulsion or dispersion. This medium is typically aqueous but involves the formation of a polymer rich phase. Most frequently, this medium is a solution of the intended capsule wall material. The solvent characteristics of the medium are changed such as to cause phase separation of the wall material from the core components. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. U.S. Pat. No. 7,736,695 discloses such a process and is incorporated herein by reference in its entirety.

In such techniques, capsule thickness can be controlled in view of the (intended) final capsule size and pressure needed to rupture the capsule. If the capsule wall thickness is too high such that it results in a relatively large particle size (at least with respect to the system used to apply an ink composition containing the capsule), the irreversible thermochromic capsule may not be able to pass through the writing point or fibrous reservoir of a writing instrument containing the irreversible thermochromic ink. On the other hand, if the shell thickness is too little, the capsule may be ruptured prematurely during the ink deposition process. Persons having ordinary skill in this art are able to balance these considerations appropriately. The irreversible thermochromic capsule shells typically have a thickness, for example, of less than about 5 microns, but greater than about 0.1 microns. For example, the shell thickness can be about 0.1 microns to about 5 microns, about 0.5 microns to about 2 microns, about 1 micron to about 4 microns, and/or about 2 microns to about 3 microns. Other suitable thicknesses include, for example, about 0.1, 0.2, 0.3, 0.4, 0.5, 0.6, 0.7, 0.8, 0.9, 1, 1.5, 2, 2.5, 3, 3.5, 4, 4.5, and 5 microns Carrier The irreversible thermochromic pigment capsules described herein are typically dispersed in a carrier to form a thermochromic ink composition. Furthermore, in the embodiments containing wax-based compositions as described herein, a carrier is generally present. For example, the color changing dye and color activator can be dispersed or dissolved in the carrier and a wax-based composition comprising the color destroying agent can be dispersed in the carrier. Alternatively, the color destroying agent can be (directly) dispersed or dissolved in the carrier and a wax-based composition comprising the color changing dye and the color activator can be (directly) dispersed in the carrier. In each of these instances, the carrier can include a solvent, a resin, or a mixture thereof. The carrier preferably exhibits strong solvency for the components dispersed or distributed therein. Furthermore, when the color changing dye and color activator are dispersed or dissolved in the carrier, the carrier components (e.g., the solvent, the resin) must be selected so as not to disrupt the interaction between the color changing dye and the color activator (i.e., a solvent or resin that functions as a color destroying agent cannot be used). Of course, the solvent must be selected so as not to solvate the irreversible thermochromic pigment capsules or the wax-based compositions of the irreversible thermochromic ink compositions such that the components distributed therein do not leach out from the wax matrix until the melting point of the wax is reached or exceeded.

Suitable solvents can be either polar or non-polar. Suitable carrier solvents can include, for example, water, alcohols, hydrocarbons (straight chain and branched), halo-substituted hydrocarbons, glycerol, and the like.

Additives

An ink composition including the irreversible thermochromic pigment capsules and/or the irreversible thermochromic pigment capsules themselves can include one or more additives as is known in the art. Such additives include, for example, biocide(s), surface tension modifier(s), other synergistic resin(s), surfactant(s), humectant(s), dispersing agent(s), and other additives known in the art. The additives can be added to the ink composition and/or included in the irreversible thermochromic pigment capsules. The additives can be added in any suitable amount so as not to adversely affect the overall performance of the ink composition or the irreversible thermochromic pigment capsules in any aspect.

The following examples are provided for illustration and are not in any way intended to limit the scope of the invention.

EXAMPLES

Example 1

A composition including one part PERGASCRIPT Black I-2R (BASF, Florham Park N.J.), three parts para-tert-octylphenol (SI Group Inc., Schenectady, N.Y.), and four parts carnauba wax were mixed by heating to a temperature in excess of the melting point of the carnauba wax. The resulting mixture was used to coat a piece of copy paper and then cooled to room temperature. The mixture solidified to form a black coating upon cooling. Coconut oil having a temperature in excess of 100° C. was dropped onto the coating. The portion of the coating in contact with the hot oil was decolorized. The decolorized area did not regain color upon cooling in a refrigerator set at about −22° C.

Example 2

A composition including one part PERGASCRIPT Red I-6B (BASF, Florham Park N.J.), three parts para-tert-octyphenol (SI Group Inc., Schenectady, N.Y.), and four parts carnauba wax were mixed by heating to a temperature in excess of the melting point of the carnauba wax. The resulting mixture was used to coat a piece of copy paper and then cooled to room temperature. The mixture solidified to form a red coating upon cooling. Coconut oil having a temperature in excess of 100° C. was dropped onto the coating. The portion of the coating in contact with the hot oil was decolorized. The decolorized area did not regain color upon cooling in a refrigerator set at about −22° C.

What is claimed is:

1. A irreversible thermochromic capsule comprising:
    an inner core comprising a color destroying agent and a wax;
    an outer core surrounding the inner core and comprising a color changing dye and a color activator for activating the color changing dye, the color changing dye and the color activator forming an activated color changing dye in the outer core; and
    a shell surrounding the outer core,
    wherein the activated color changing dye is capable of changing colors or becoming substantially colorless upon contacting the color destroying agent.

2. The irreversible thermochromic capsule of claim 1, wherein the color changing dye comprises a leuco dye.

3. The irreversible thermochromic capsule of claim 1, wherein the color activator comprises a phenolic compound.

4. The irreversible thermochromic capsule of claim 1, wherein the wax has a melting point of about 50° C. to about 120°.

5. The irreversible thermochromic capsule of claim 1, wherein the color destroying agent is selected from esters, dibasic esters, ethers, alcohols, polyhydric alcohols, ketones, sulfolanes, sulfones, sulfoxides, carbonates, formates, silicones, amines, and combinations thereof.

6. The irreversible thermochromic capsule of claim 1, wherein the color destroying agent comprises coconut oil.

7. The irreversible thermochromic capsule of claim 1, wherein the shell comprises a polymer.

8. The irreversible thermochromic capsule of claim 7, wherein the polymer is selected from the group consisting of polyureas, polyamides, polyesters, polyurethanes, and mixtures thereof.

9. An irreversible thermochromic ink comprising:
    a carrier; and
    the irreversible thermochromic capsule of claim 1.

10. A method of erasing a written mark, comprising:
    making a written mark using the irreversible thermochromic ink of claim 9, the written mark comprising a plurality of thermochromic pigment capsules; and
    heating the written mark comprising the plurality of irreversible thermochromic pigment capsules to a temperature greater than a melting point of the wax, thereby allowing the color destroying agent to interact with the color activator and the color changing dye such that the color changing dye changes color or becomes substantially colorless.

11. An irreversible thermochromic ink comprising:
    a carrier;
    a color changing dye dispersed or dissolved in the carrier, a color activator dispersed or dissolved in the carrier, the color changing dye and the color activator forming an activated color changing dye in the carrier, and a wax-based composition dispersed in the carrier, the wax-based composition comprising a wax and a color destroying agent, wherein the color destroying agent comprises coconut oil.

12. The irreversible thermochromic ink of claim 11, wherein the carrier comprises a solvent, a resin, or a mixture thereof.

13. The irreversible thermochromic ink of claim 11, wherein the color changing dye comprises a leuco dye.

14. The irreversible thermochromic ink of claim 11, wherein the color activator comprises a phenolic compound.

15. The irreversible thermochromic ink of claim 11, further comprising at least one additive selected from the group consisting of biocides, surface tension modifies, synergistic resins, surfactants, humectants, dispersing agents, and mixtures thereof.

16. A method of erasing a written mark, comprising:
making a written mark using the irreversible thermochromic ink of claim 11; and heating the written mark to a temperature greater than a melting point of the wax, thereby allowing the color destroying agent to interact with the color activator and the color changing dye such that the color changing dye changes color or becomes substantially colorless.

17. The method of any of claim 16, wherein the heating to a temperature greater than a melting point of the wax comprises applying a force directing element to the written mark to generate friction between the force directing element and the written mark.

18. A writing instrument comprising the irreversible thermochromic ink of claim 11.

19. An irreversible thermochromic ink comprising:
a carrier;
a color destroying agent dispersed or dissolved in the carrier, wherein the color destroying agent comprises coconut oil, and
a wax-based composition dispersed in the carrier, the wax-based composition comprising a wax, a color changing dye, and a color activator, the color changing dye and the color activator forming an activated color changing dye in the wax-based composition.

\* \* \* \* \*